(12) United States Patent
Lee et al.

(10) Patent No.: US 7,990,638 B2
(45) Date of Patent: Aug. 2, 2011

(54) LENS MODULE

(75) Inventors: Chai-Wei Lee, Taipei Hsien (TW); Hou-Yao Lin, Taipei Hsien (TW); Chia-Chun Chang, Taipei Hsien (TW); Sheng-Jung Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/767,817

(22) Filed: Apr. 27, 2010

(65) Prior Publication Data

US 2010/0328793 A1    Dec. 30, 2010

(30) Foreign Application Priority Data

Jun. 25, 2009  (CN) .......................... 2009 1 0303658

(51) Int. Cl.
*G02B 7/02* (2006.01)
*G02B 15/14* (2006.01)

(52) U.S. Cl. ............... 359/829; 359/811; 359/704
(58) Field of Classification Search ......... 359/694–704, 359/811–824, 829
See application file for complete search history.

(56) References Cited

U.S. PATENT DOCUMENTS

2006/0103953 A1 * 5/2006 Lee et al. ................. 359/819
* cited by examiner

*Primary Examiner* — Mohammed Hasan
(74) *Attorney, Agent, or Firm* — Zhigang Ma

(57) ABSTRACT

A lens module includes a lens barrel and a lens holder. The lens barrel includes a barrel. The barrel includes an outer surface and an outer thread portion formed on the outer surface. The lens holder includes a main body. The main body defines a receiving space to receive the lens barrel. An inner thread portion matching the outer thread portion is formed on an inner surface of the receiving space. The angle between the outer surface of the lens barrel and an optical axis of the lens module is different from the angle between the inner surface of the receiving space and the optical axis of the lens module.

10 Claims, 6 Drawing Sheets

LENS MODULE

BACKGROUND

1. Technical Field

The present disclosure relates to lens modules and, particularly, to a lens module capable of controlling the friction between a lens barrel and a lens holder of the lens module.

2. Description of Related Art

A conventional lens module usually includes a lens barrel and a lens holder. The lens barrel includes an outer thread portion, and the lens holder includes an inner thread portion. The lens barrel is secured to the lens holder via the engagement between the outer thread portion and the inner thread portion. Therefore, when screwing the lens barrel into the lens holder, the amount of torsion between the lens barrel and the lens holder is critical. If the torsion is too strong, the threads may be damaged. If the torsion is too weak, the lens barrel will become loose.

BRIEF DESCRIPTION OF THE DRAWINGS

The components of the drawings are not necessarily drawn to scale, the emphasis instead being placed upon clearly illustrating the principles of a lens module. Moreover, in the drawings, like reference numerals designate corresponding parts throughout several views.

DETAILED DESCRIPTION

Figure 1:
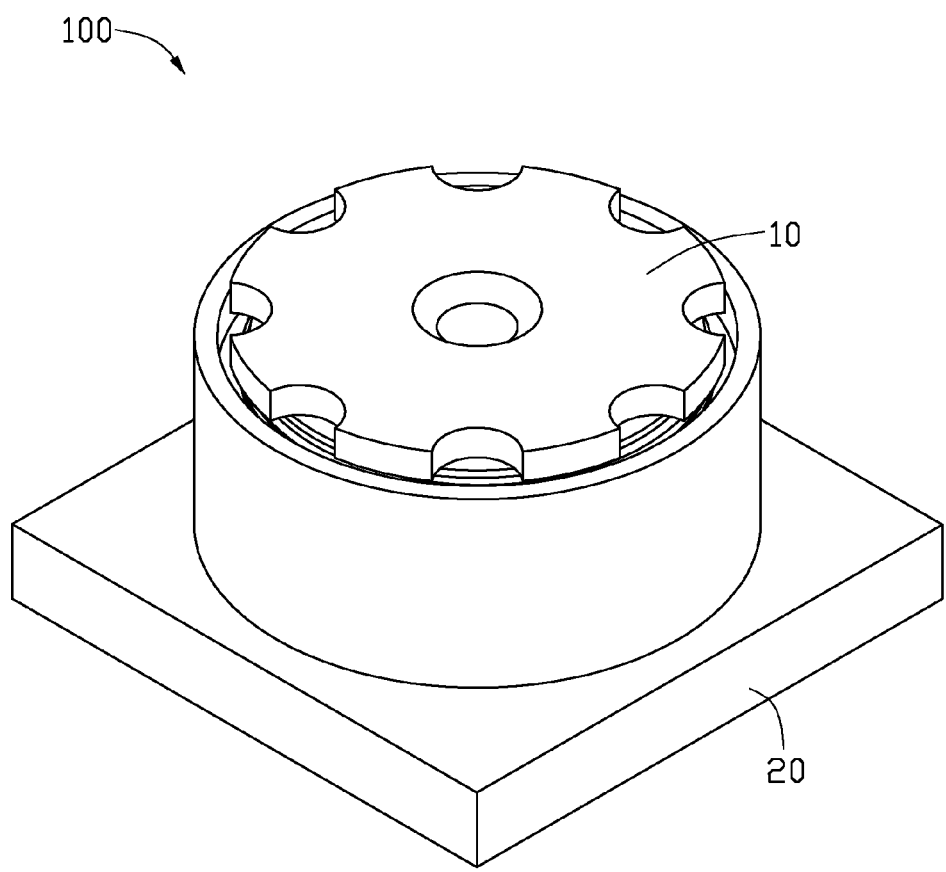
FIG. 1 is an isometric view of a lens module in accordance with a first embodiment.
Figure 2:
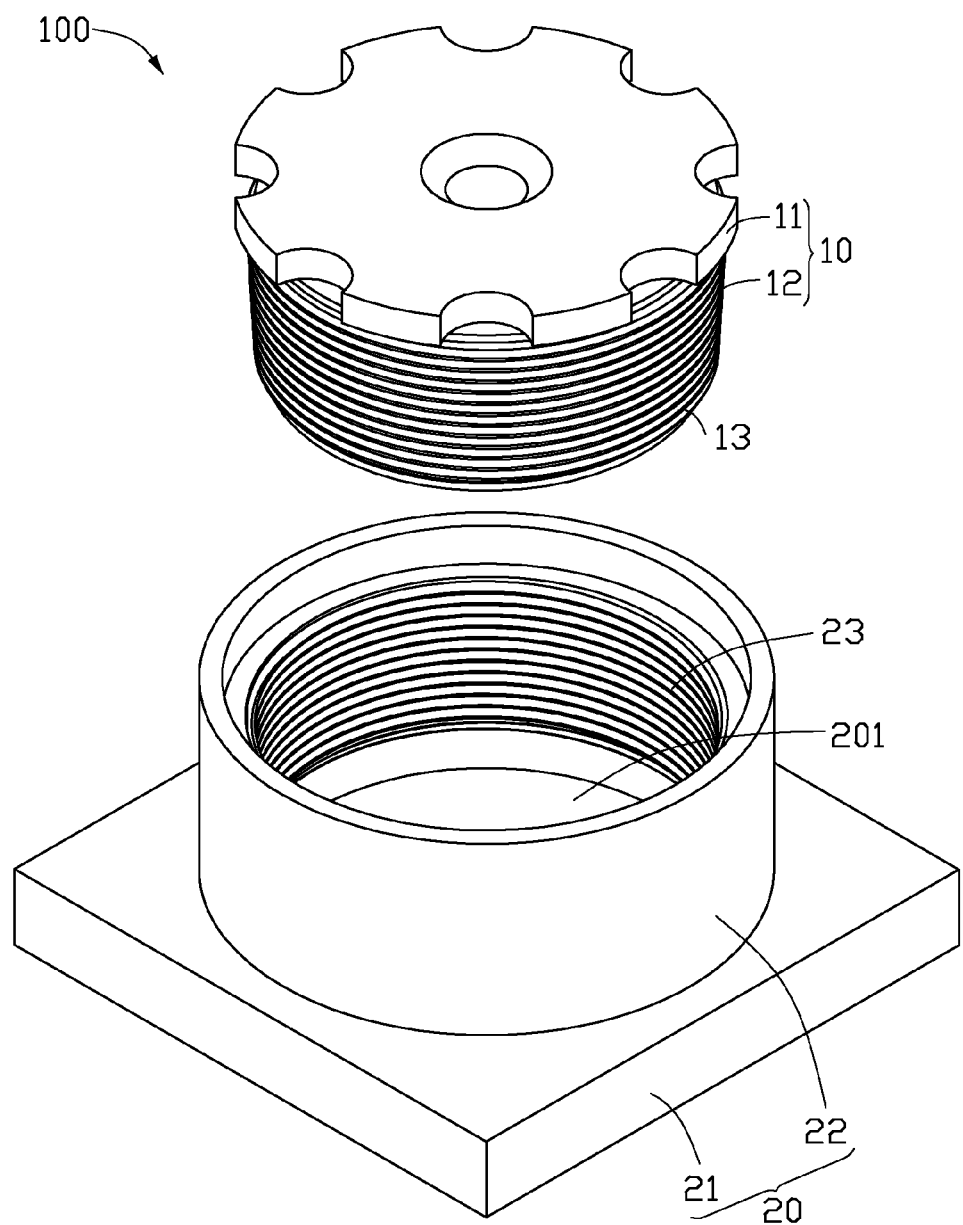
FIG. 2 is an exploded, perspective view of the lens module of FIG. 1.
Figure 3:
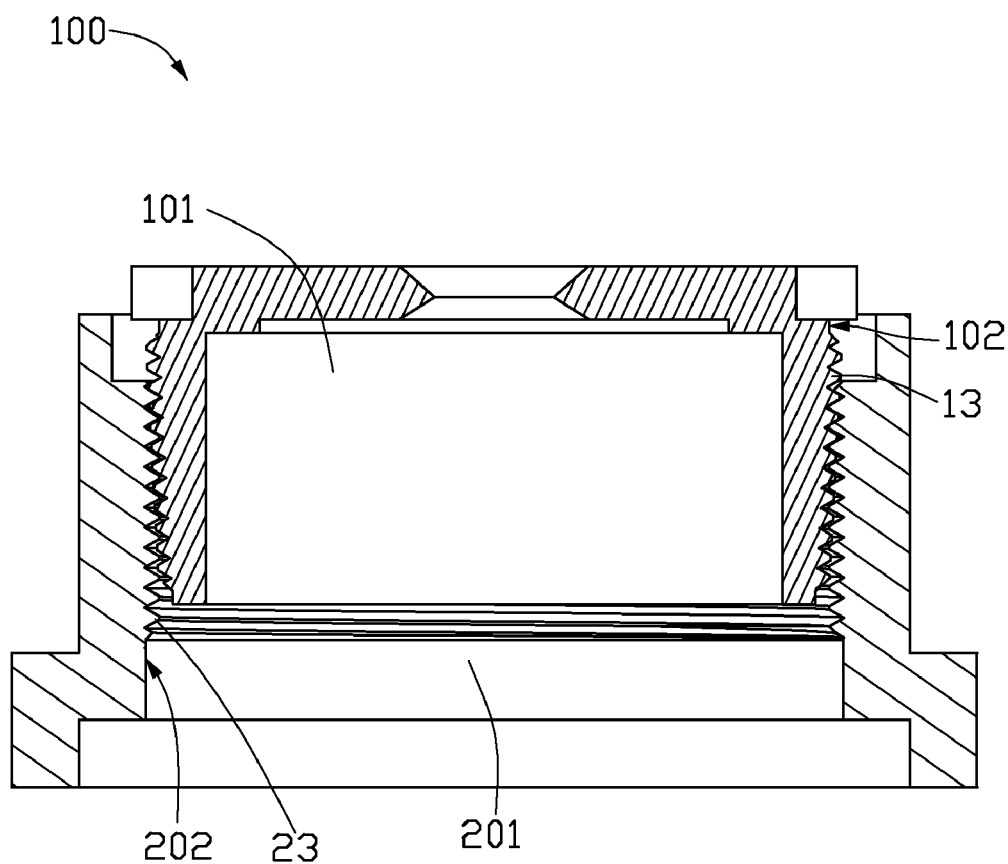
FIG. 3 is a cross-sectional view of the lens module of FIG. 1.

Referring to FIGS. 1-3, an embodiment of a lens module 100 is illustrated. The lens module 100 includes a lens barrel 10 and a lens holder 20.

The lens barrel 10 includes a focus-adjusting ring 11 and a barrel 12. The ring 11 is rotatably mounted on the top of the barrel 12 and configured to adjust the focal length of the lens module 100.

The barrel 12 defines a first receiving space 101 to receive optical elements (not shown). The first receiving space 101 is substantially cylindrical. The barrel 12 includes an outer surface 102. An outer thread portion 13 is formed on the outer surface 102. In the embodiment, the barrel 12 is substantially frustum shaped. The distance between the outer surface 102 and the optical axis of the lens module 100 gradually decreases from the top of the barrel 12 to the bottom of the barrel 12. Therefore, the major diameter of the outer thread portion 13 gradually decreases from the top of the barrel 12 to the bottom of the barrel 12. In the embodiment, the angle between the outer surface 102 and the optical axis is greater than 0 degree and less than or equal to 30 degree.

The lens holder 20 includes a base 21 and a main body 22 secured to the base 21. The main body 22 defines a second receiving space 201 to receive the lens barrel 10. An inner thread portion 23 matching the outer thread portion 13 is formed on an inner surface 202 of the second receiving space 201. In the embodiment, the second receiving space 201 is substantially cylindrical. Therefore, the minor diameter of the inner thread portion 23 remains constant from the top of the main body 22 to the bottom of the main body 22.

With such configuration, the further the lens barrel 10 is screwed into the lens holder 20, the contact area between the outer thread portion 13 and the inner thread portion 23 increases to create greater friction between the lens barrel 10 and the lens holder 20 so that strong torsion is not needed until the end of screwing the lens barrel 10 into the lens holder 20. Therefore, the lens barrel 10 can be screwed into the lens holder 20 without such a great risk of damaging threads from using too strong torsion, and an assembly person can screw the lens barrel 10 into the lens holder 20 confidently, thus avoiding using too little torsion and leaving the lens barrel 10 loose in the lens holder 20.

Figure 4:
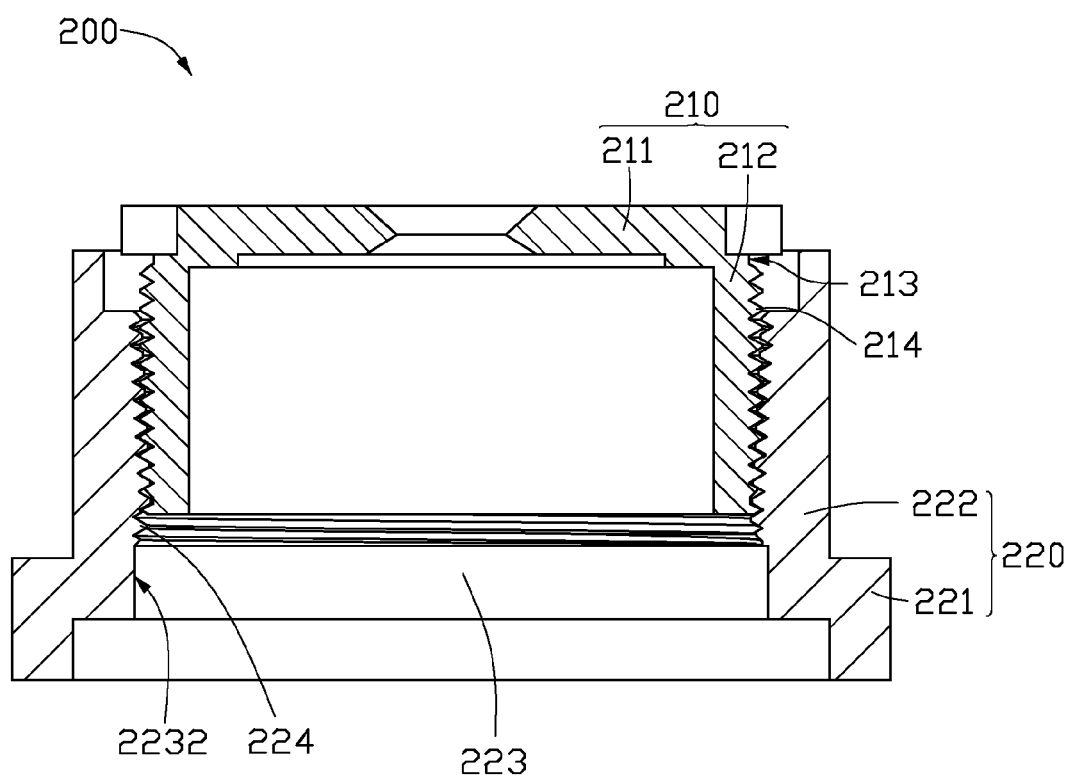
FIG. 4 is a cross-sectional view of a lens module in accordance with a second embodiment.

Referring also to FIG. 4, a lens module 200 different from the lens module 100 is illustrated. The lens module 200 includes a lens barrel 210 and a lens holder 220. The lens barrel 210 includes a focus-adjusting ring 211 and a barrel 212. The barrel 212 includes an outer surface 213. An outer thread portion 214 is formed on the outer surface 213. In the embodiment, the barrel 212 is generally cylindrical. Therefore, the major diameter of the outer thread portion 214 remains constant from the top of the barrel 212 to the bottom of the barrel 212.

The lens holder 220 includes a base 221 and a main body 222. The main body 222 defines a receiving space 223 to receive the lens barrel 210. An inner thread portion 224 is formed on an inner surface 2232 of the receiving space 223. In the embodiment, the receiving space 223 is generally frustum shaped. The distance between the inner surface 2232 and the optical axis of the lens module 200 gradually decreases from the top of the main body 222 to the bottom of the main body 222. Therefore, the minor diameter of the inner thread portion 224 gradually decreases from the top of the main body 222 to the bottom of the main body 222. In the embodiment, the angle between the inner surface 2232 and the optical axis of the lens module 200 is greater than 0 degree and less than or equal to 30 degree.

With such configuration, the further the lens barrel 210 is screwed into the lens holder 220, the contact area between the outer thread portion 214 and the inner thread portion 224 increases to create greater friction between the lens barrel 210 and the lens holder 220.

Figure 5:
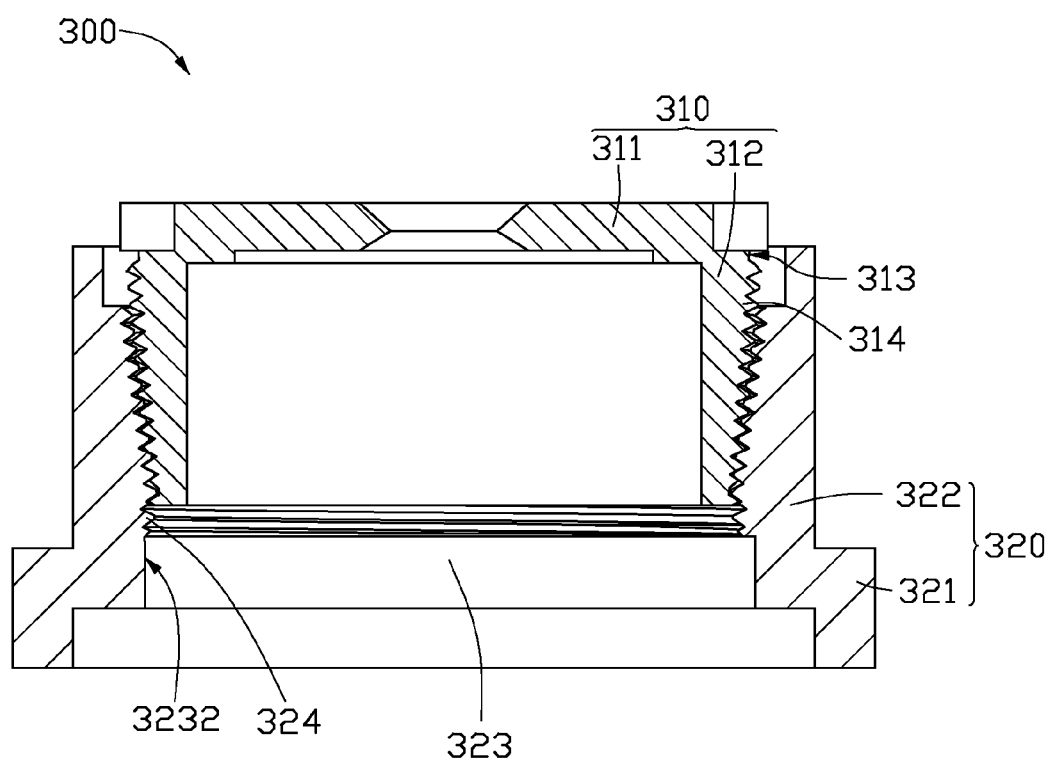
FIG. 5 is a cross-sectional view of a lens module in accordance with a third embodiment.

Referring also to FIG. 5, a lens module 300 different from the lens module 100 is illustrated. The lens module 300 includes a lens barrel 310 and a lens holder 320. The lens barrel 310 includes a focus-adjusting ring 311 and a barrel 312. The barrel 312 includes an outer surface 313. An outer thread portion 314 is formed on the outer surface 313. In the embodiment, the barrel 312 is substantially frustum shaped. The distance between the outer surface 313 and the optical axis of the lens module 300 gradually decreases from the top of the barrel 312 to the bottom of the barrel 312. Therefore, the major diameter of the outer thread portion 314 gradually decreases from the top of the barrel 312 to the bottom of the barrel 312.

The lens holder 320 includes a base 321 and a main body 322. The main body 322 defines a receiving space 323 to receive the lens barrel 310. An inner thread portion 324 is formed on an inner surface 3232 of the receiving space 323. In the embodiment, the receiving space 323 is substantially frustum shaped. The distance between the inner surface 3232 and the optical axis of the lens module 300 gradually decreases from the top of the main body 322 to the bottom of the main body 322. Therefore, the minor diameter of the inner thread portion 324 gradually decreases from the top of the main body 322 to the bottom of the main body 322. It should be noted that in the embodiment the angle between the inner surface 3232 and the optical axis of the lens module 300 is greater than the angle between the outer surface 313 and the optical axis of the lens module 300.

With such configuration, the further the lens barrel 310 is screwed into the lens holder 320, the contact area between the outer thread portion 314 and the inner thread portion 324 thus increases to create greater friction between the lens barrel 310 and the lens holder 320 to become stronger.

Figure 6:
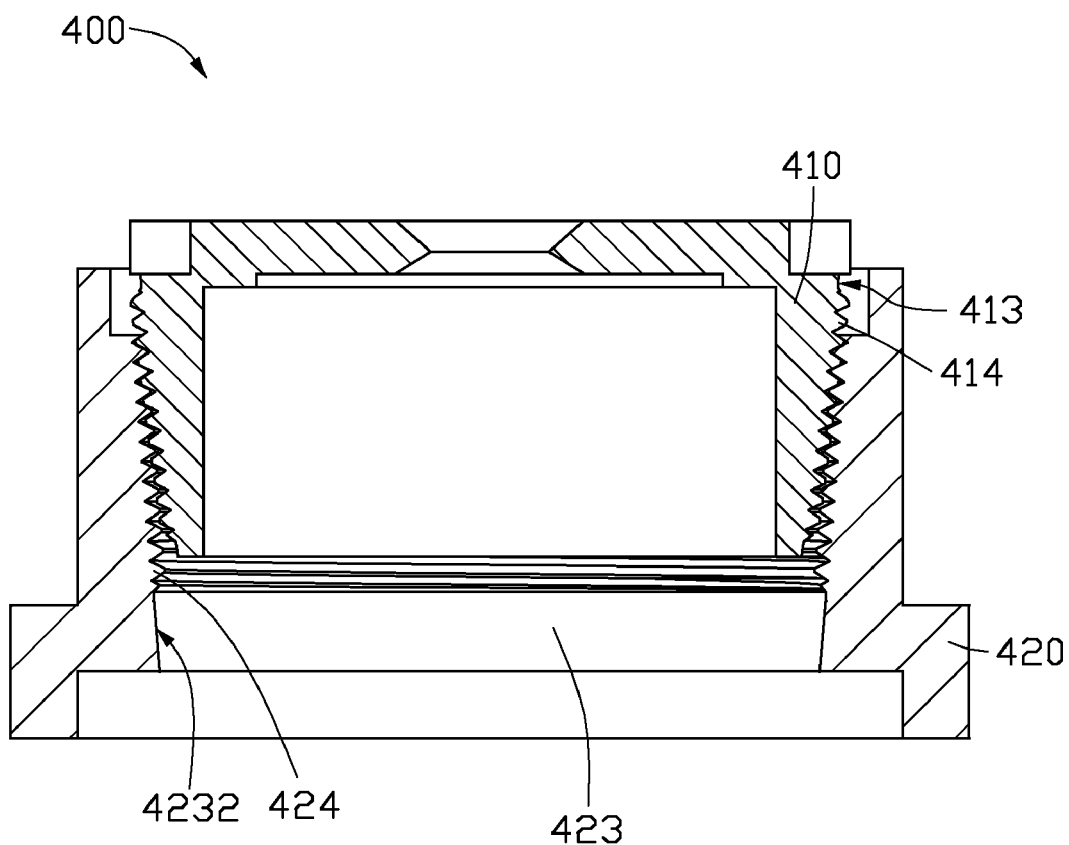
FIG. 6 is a cross-sectional view of a lens module in accordance with a fourth embodiment.

Referring also to FIG. 6, a lens module 400 similar to the lens module 300 is illustrated. The lens module 400 includes a lens barrel 410 and a lens holder 420. Comparing to the lens module 300, the angle between an inner surface 4232 of a receiving space 423 and the optical axis of the lens module 400 is less than the angle between an outer surface 413 of the lens barrel 410 and the optical axis of the lens module 400.

With such configuration, the further the lens barrel 410 is screwed into the lens holder 420, the contact area between the outer thread portion 314 and the inner thread portion 324 increases to create greater friction between the lens barrel 310 and the lens holder 320 to become stronger.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A lens module, comprising:
a lens barrel comprising a barrel comprising an outer surface and an outer thread portion formed on the outer surface; and
a lens holder comprising a main body, wherein the main body defines a receiving space to receive the lens barrel, an inner thread portion matching the outer thread portion is formed on an inner surface of the receiving space, one of the major diameter of the outer thread portion and the minor diameter of the inner thread portion remains constant from a top of the lens module to a bottom of the lens module, the other of the major diameter of the outer thread portion and the minor diameter of the inner thread portion gradually decreases from the top of the lens module to the bottom of the lens module.

2. The lens module as described in claim 1, wherein the major diameter of the outer thread portion gradually decreases from a top of the barrel to a bottom of the barrel, and the minor diameter of the inner thread portion remains constant from a top of the main body to a bottom of the main body.

3. The lens module as described in claim 2, wherein the barrel is frustum shaped, the distance between the outer surface of the barrel and the optical axis of the lens module gradually decreases, and the receiving space is cylindrical.

4. The lens module as described in claim 3, wherein the angle between the outer surface of the barrel and the optical axis of the lens module is greater than 0 degree and less than or equal to 30 degree.

5. The lens module as described in claim 1, wherein the minor diameter of the inner thread portion gradually decreases from a top of the main body to a bottom of the main body, and the major diameter of the outer thread portion remains constant from a top of the barrel to a bottom of the barrel.

6. The lens module as described in claim 5, wherein the barrel is cylindrical, and the receiving space of the main body is frustum shaped, the distance between the inner surface of the receiving space and the optical axis of the lens module gradually decreases from a top of the main body to a bottom of the main body.

7. The lens module as described in claim 6, wherein the angle between the inner surface of the receiving space and the optical axis of the lens module is greater than 0 degree and less than or equal to 30 degree.

8. The lens module as described in claim 1, wherein the lens barrel further comprises a focus-adjusting ring located on a top of the barrel, and the focus-adjusting ring has a plurality of curved recesses formed in an outer surface of the focus-adjusting ring.

9. A lens module, comprising:
a lens barrel comprising a barrel comprising an outer surface and an outer thread portion formed on the outer surface; and
a lens holder comprising a main body, wherein the main body defines a receiving space to receive the lens barrel, an inner thread portion matching the outer thread portion is formed on an inner surface of the receiving space, wherein the barrel and the receiving space are frustum shaped, the distance between the outer surface and the optical axis of the lens module gradually decreases from a top of the barrel to a bottom of the barrel, and the distance between the inner surface and the optical axis of the lens module gradually decreases from a top of the main body to a bottom of the main body, wherein the angle between the inner surface and the optical axis of the lens module is less than the angle between the outer surface and the optical axis of the lens module.

10. The lens module as described in claim 9, wherein the lens barrel further comprises a focus-adjusting ring located on a top of the barrel, and the focus-adjusting ring has a plurality of curved recesses formed in an outer surface of the focus-adjusting ring.

* * * * *